(12) United States Patent
Dordor et al.

(10) Patent No.: US 9,665,070 B2
(45) Date of Patent: May 30, 2017

(54) DEVICE WITH IMAGE GUIDE FOR TIMEPIECES

(71) Applicant: Richemont International SA, Villars-sur-Glane (CH)

(72) Inventors: Sébastien Dordor, Zürich (CH); Debora Schelling, Schleitheim (CH)

(73) Assignee: Richemont International SA, Villars-sur-Glane (CH)

( * ) Notice: Subject to any disclaimer, the term of this patent is extended or adjusted under 35 U.S.C. 154(b) by 7 days.

(21) Appl. No.: 14/343,679

(22) PCT Filed: Sep. 28, 2012

(86) PCT No.: PCT/EP2012/069239
§ 371 (c)(1),
(2) Date: Mar. 7, 2014

(87) PCT Pub. No.: WO2013/050305
PCT Pub. Date: Apr. 11, 2013

(65) Prior Publication Data
US 2014/0226445 A1 Aug. 14, 2014

(30) Foreign Application Priority Data
Oct. 7, 2011 (CH) .................. 01644/11

(51) Int. Cl.
*G04C 17/00* (2006.01)
*G04G 17/02* (2006.01)
*G02B 6/06* (2006.01)

(52) U.S. Cl.
CPC ..... *G04C 17/0091* (2013.01); *G04C 17/0058* (2013.01); *G04G 17/02* (2013.01); *G02B 6/06* (2013.01)

(58) Field of Classification Search
CPC .................. G04C 17/0058; G04C 17/0091
See application file for complete search history.

(56) References Cited

U.S. PATENT DOCUMENTS

| | | | |
|---|---|---|---|
| 3,566,602 | A | 3/1971 | Bergey et al. |
| 3,966,303 | A | 6/1976 | Yamamoto |
| 4,733,383 | A | 3/1988 | Waterbury |
| 5,818,998 | A | 10/1998 | Harris et al. |

(Continued)

FOREIGN PATENT DOCUMENTS

| | | |
|---|---|---|
| CH | 574 634 B5 | 4/1976 |
| CH | 585 926 B5 | 3/1977 |
| DE | 1 021 298 B | 12/1957 |

(Continued)

*Primary Examiner* — Amy Cohen Johnson
*Assistant Examiner* — Jason Collins
(74) *Attorney, Agent, or Firm* — Christensen, Fonder, Dardi & Herbert PLLC

(57) ABSTRACT

A device which is suitable for integration into a timepiece, in particular in the form of a timepiece module, another type of watch module or a basic watch movement. The device includes at least one opening, in each of which an associated image guide is mounted, and for each of these image guides the device including means for fastening the image guide in the associated opening, such that the image guide allows display information displayed on a representation plane to be reproduced on a display plane.

32 Claims, 11 Drawing Sheets

(56) References Cited

U.S. PATENT DOCUMENTS 5,894,456 A * 4/1999 Schneider .............. G04B 47/00
368/227
2002/0036955 A1 3/2002 Basturk

FOREIGN PATENT DOCUMENTS

| | | |
|---|---|---|
| DE | 29 36 953 A | 3/1980 |
| EP | 0 052 063 A1 | 5/1982 |
| EP | 0 181 809 A1 | 5/1986 |
| EP | 1 574 918 A1 | 9/2005 |
| EP | 1 626 316 A1 | 2/2006 |
| EP | 1 873 696 A1 | 1/2008 |
| EP | 1 918 792 A1 | 5/2008 |
| EP | 2 354 861 A1 | 8/2011 |
| FR | 2 438 861 A1 | 5/1980 |
| GB | 1 579 088 A | 11/1980 |
| JP | 50091569 U | 8/1975 |
| WO | WO 2006/119019 A1 | 11/2006 |

\* cited by examiner

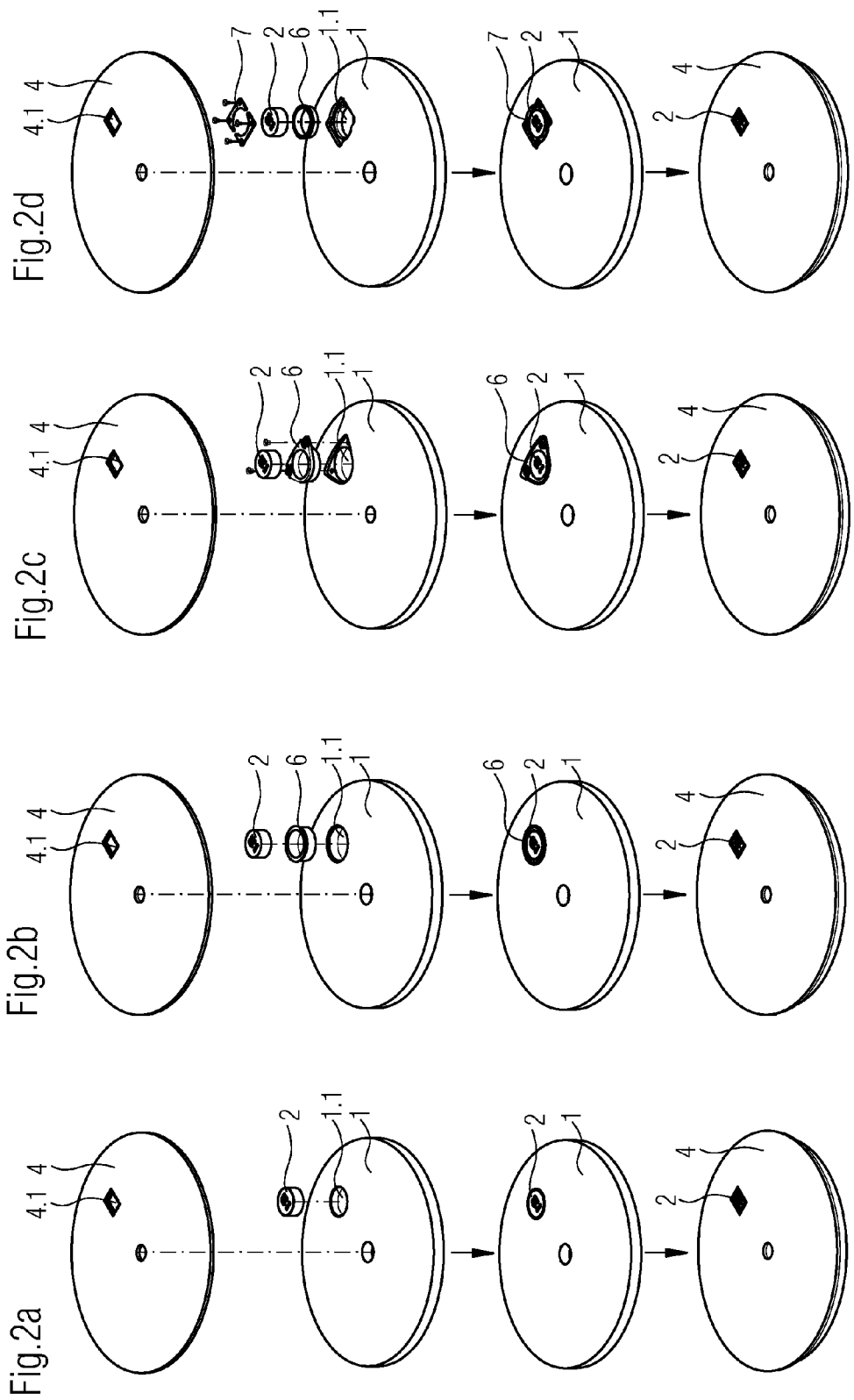

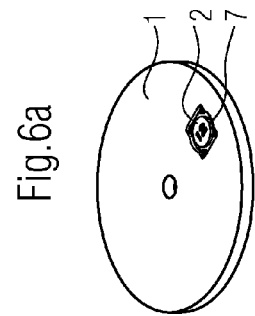
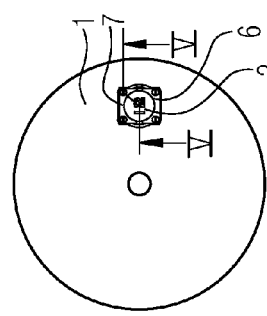
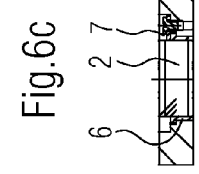
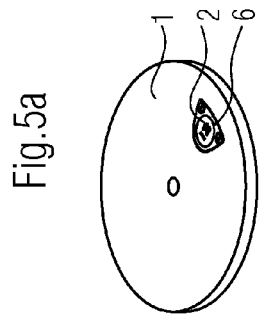
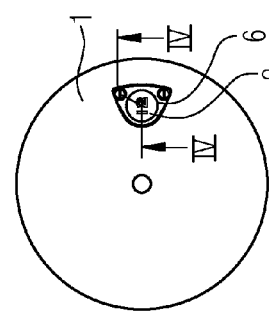
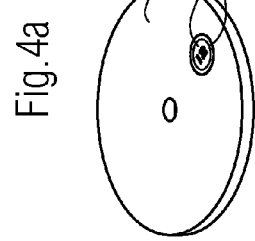
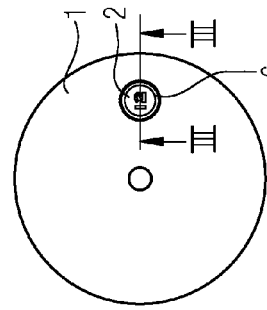
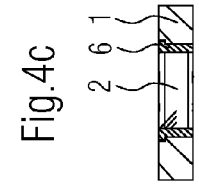
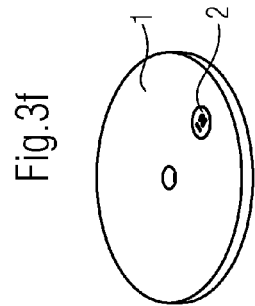
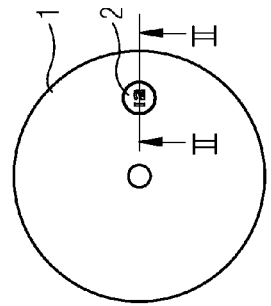
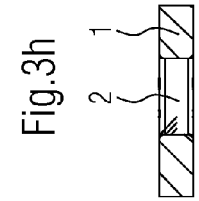

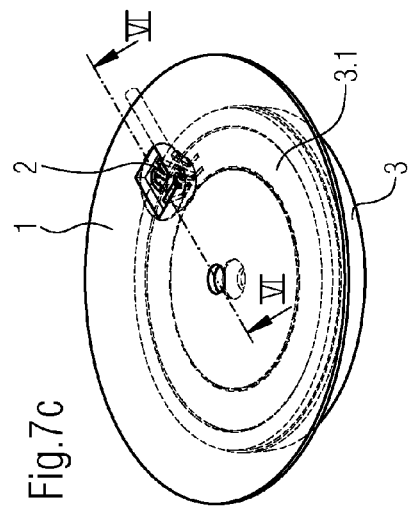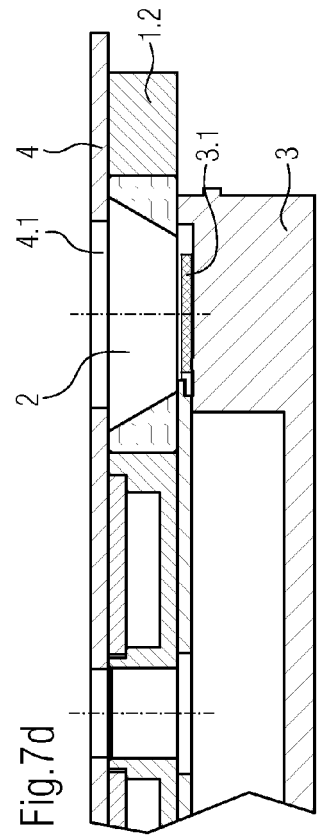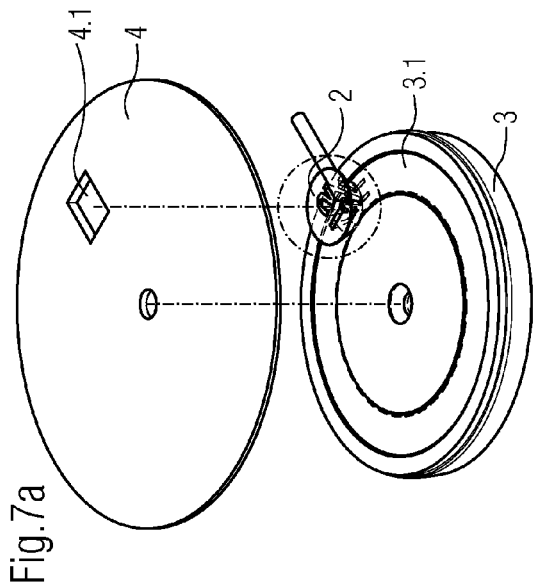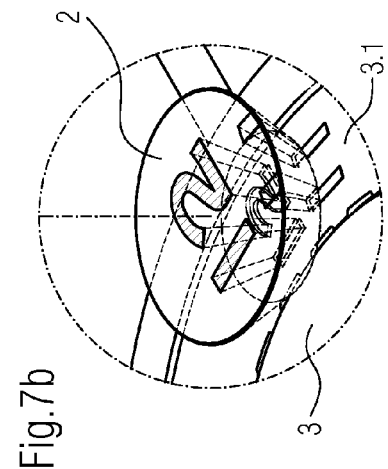

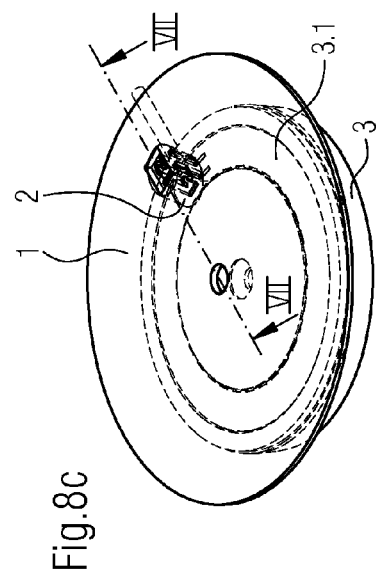
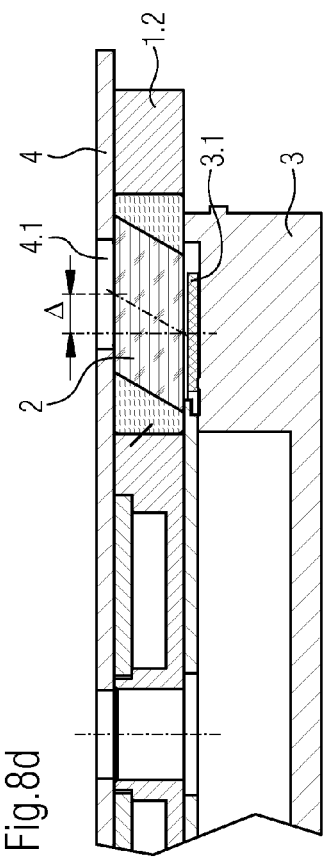
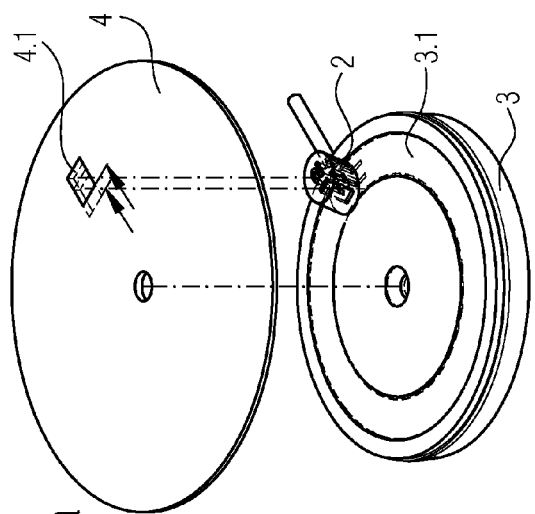
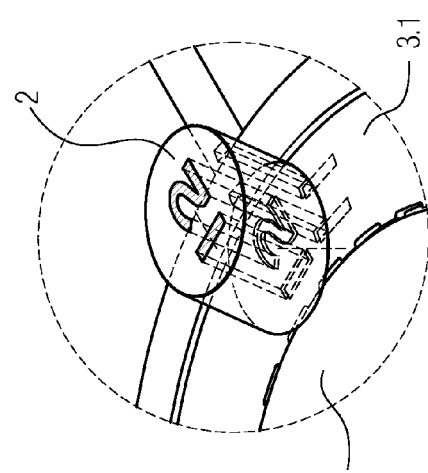

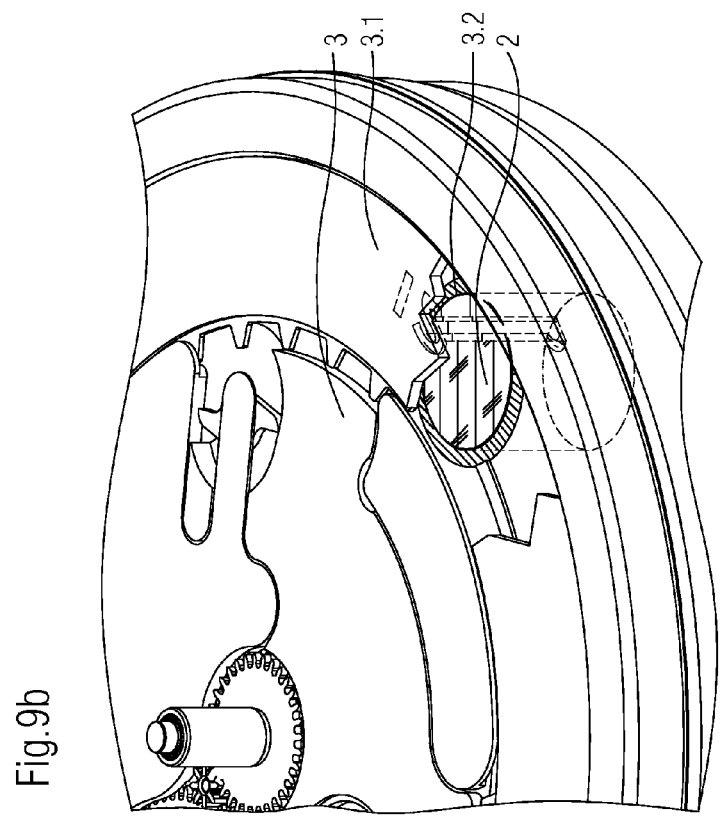
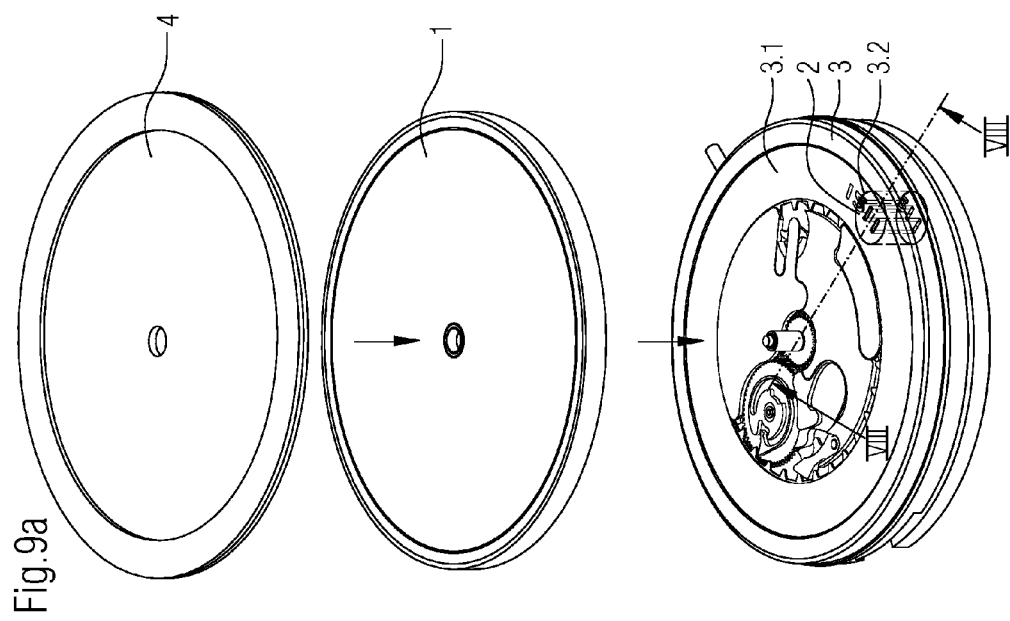

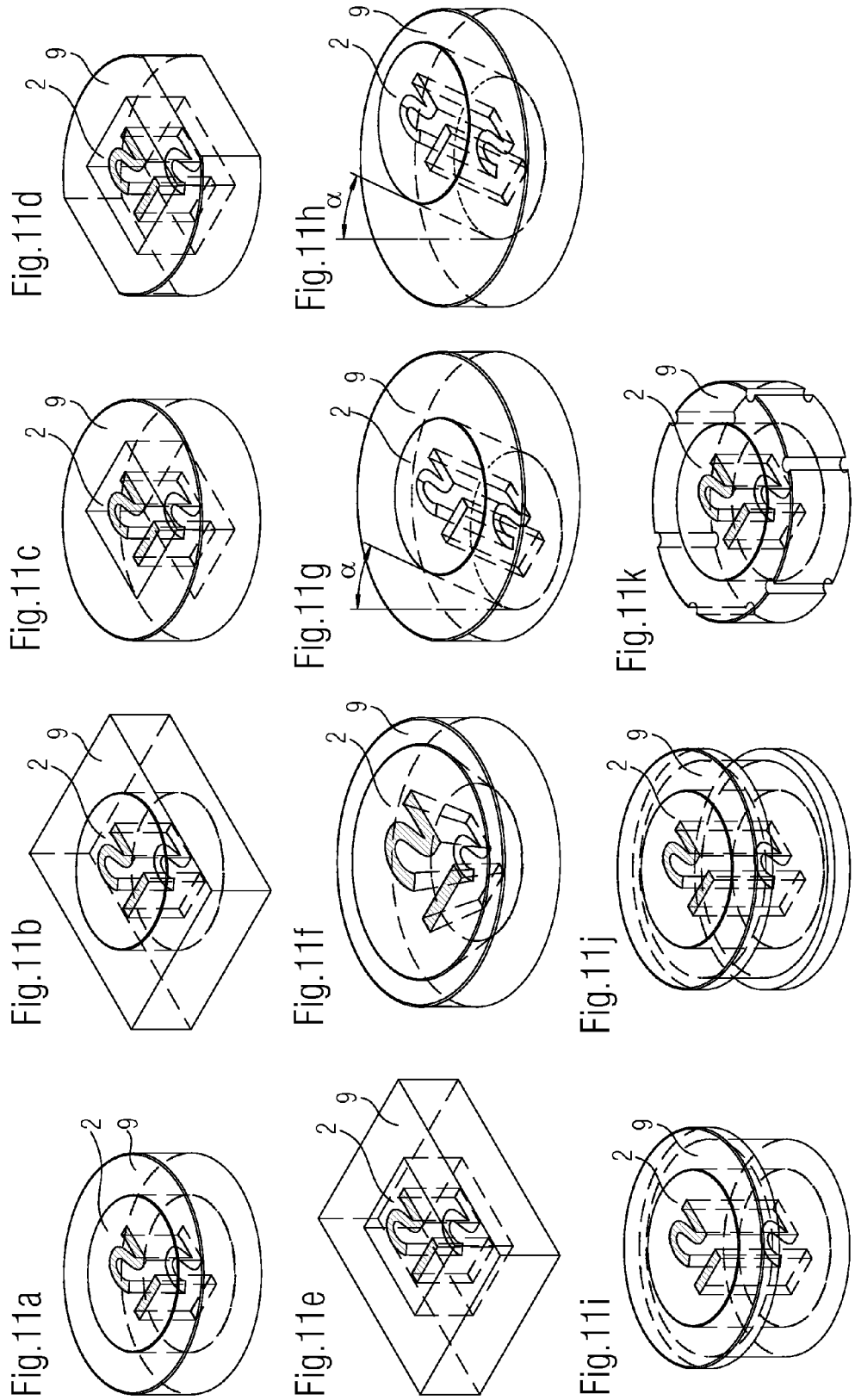

DEVICE WITH IMAGE GUIDE FOR TIMEPIECES

PRIORITY CLAIM

The present application is a National Phase entry of PCT Application No. PCT/EP2012/069239, filed Sep. 28, 2012, which claims priority from Swiss Patent Application Number 01644/11, filed Oct. 7, 2011, the disclosures of which are hereby incorporated by reference herein in their entirety.

FIELD OF THE INVENTION

The present invention relates to a device which is suitable for integration into a watch, in particular to a timepiece module, another type of watch module or a basic watch movement, and to a corresponding watch equipped with such a device.

BACKGROUND OF THE INVENTION

The background of the present invention is the fact that the watch-making industry nowadays strives towards, and is capable of, integrating ever more complex functions into watches, and also in particular into mechanical watches, while at the same time trying to put this into practice in as technically simple—and aesthetically appealing—way as possible.

This has led on the one hand, for example, to the increasingly widespread use of timepiece modules which can be attached to the basic watch movement in a simple manner and, in cooperation with this, allow at least one additional function to be implemented, to the extent that this facilitates a modular construction. This is because such timepiece modules can be mounted on a basic watch movement without requiring any major changes in the latter, and, due to the cooperation with the basic watch movement, provide the watch with additional functions. For example, a timepiece module driven by the basic watch movement and mounted thereon can provide various astronomical data, an eternal calendar function, an acoustic repetition function, an alarm function, the display information required in regatta or diving watches, or similar information in a compact manner.

On the other hand, doing so necessarily moves the display information provided by the basic watch movement, which can consist, for example, of the standard date display, further away from the display plane defined by the watch dial, insofar as the timepiece module is typically placed between the dial and the basic watch movement. In the designs known to date, the result is that the user of the watch perceives the display information provided by the basic watch movement as being situated very much lower relative to the plane of the dial, and, in addition, that it is readable only within a reduced angular viewing range.

Similar difficulties also affect the use of other watch modules, not in direct cooperation with the movement, which can be attached to the movement and allow at least one additional feature to be implemented. In fact, such watch modules are becoming increasingly common as watches are more often equipped with complex functions and they can consist, for example, of a pressure gauge which is used to implement a depth gauge or altimeter, or the like. Such modules are able to function independently of the basic watch movement, and, like the above-mentioned additional timepiece modules, allow a modular construction. As in the case of a timepiece module, however, it is also possible when such an independent watch module is attached, depending on its placement relative to the movement, which is often radially around or below the latter, that the available display information provided, for example, on the top of said watch module, is situated in an unfavorable position relative to the plane of the dial. It then requires cumbersome and technically complex design changes to the basic watch movement to place the display information on the plane of the dial in order to allow the user a comfortable and aesthetically pleasing level of readability.

Finally, this set of problems is even found in some basic watch movements. For example, some timepiece movements comprise a display of the timepiece's power reserve, wherein this can be located, for example, on the dial side of the timepiece movement, depending on the configuration of the basic watch movement. To avoid overloading the dial of a complex watch with various displays, however, it can be desirable to display this information through a window at the bottom of the watch case. This would lead to a technically complex and expensive reconfiguration of the movement, however. Another example is a mode display that is sometimes present in basic watch movements, such as the on-off information of an alarm function in mechanical timepieces, which is usually located in the middle of the basic watch movement at the same level as the winding shaft, and which must be brought to the level of the dial, for example, by appropriate measures.

One approach to overcoming these difficulties, provided consideration is restricted to timepiece modules of the above-mentioned type, can be in designing and manufacturing timepiece modules to be as thin as possible, in order to keep the aesthetic disadvantage within limits as far as possible. However, this brings with it tight constraints in terms of technical feasibility, particularly in the case of certain functions to be installed in the timepiece module, as well as general cost increases in design and production. The same applies in connection with the other watch modules mentioned above, or with basic watch movements themselves.

In general, it is also known, in principle, in the watch-making industry to use so-called image guides which allow the optical displacement of an image from a given plane to a different display plane. Thus, for example, the U.S. Pat. No. 3,566,602 from as early as 1971 describes the use of image guides to deflect the display information from a display disk in the plane of the watch onto a display plane which is inclined in relation to the plane of the watch. A different application of image guides, or optical fibers in general, in watches, which is aimed more at implementing aesthetic effects, is disclosed in the patent application DE 2 936 953 from the year 1979. Further examples of the use of image guides in watches are given in the documents EP 0 181 809 or U.S. Pat. No. 3,966,303.

It should be noted, however, that following these publications, the use of image guides in the watch-making industry, in spite of their benefits specified in these documents, has not established itself and is extremely uncommon today, in fact almost non-existent to the best of the Applicant's knowledge. The reasons for this lie, inter alia, in the fact that the processing of image guides is relatively difficult due to their sensitivity, caused by their material properties, and that in particular image guides mounted in wristwatches, being portable objects, can be easily damaged by shocks. In particular, it should be noted that, due to their sensitivity to impacts and pressure, image guides can suffer damage very easily during their processing, for example, in the course of the production process of watches and in particular when being installed in a watch. This as well as the distance that is needed between the image guide and the original display plane of the display information can lead to at least partial loss of quality of the transmitted image, e.g., in the form of reduced edge sharpness and color intensity, and even to the extent of obscuring the image, thereby counteracting the potential benefits of image guides.

SUMMARY OF THE INVENTION

The aim of the present invention is in this context to overcome the difficulties and disadvantages explained above, and—contrary to the currently prevailing view of experts in the watch-making industry—to implement a device which advantageously allows further functions to be added in a modular way to a basic watch movement, and at the same time the display information displayed on a representation plane to be observed without any aesthetic disadvantage at the level of a display plane which can be chosen as freely as possible. The subject matter of the present invention is therefore a device having the characteristic features cited in claim 1, and a corresponding timepiece which comprises such a device.

To implement the above-mentioned objectives, the invention is characterized in particular in that the device comprises at least one opening, in each of which an associated image guide is mounted, and that for each of these image guides the device comprises means for fastening the image guide in the associated opening, such that the image guide allows display information displayed on a representation plane to be reproduced on a display plane.

In particular, the device can consist of a timepiece module being in cooperation with the basic watch movement, of another timepiece module working independently of the basic watch movement, or of the basic watch movement itself, wherein in each case at least an image guide is mounted with suitable fastening means in at least one associated opening, so that the display information displayed on a representation plane is reproduced on a display plane.

The opening in the device can be configured, according to requirements, in a continuous or non-continuous manner, i.e., facing in one direction, so that the display information can be routed onto a display plane from very flexibly selectable points. Thus, for example in the case of a timepiece module according to the invention equipped with image guides in at least one continuous opening, display information which is originally displayed on the representation plane of the basic watch movement by means of display disks and/or pointers, can be represented on the display plane of the timepiece module. In the case of a basic watch movement, by the latter being equipped with an image guide also in a continuous opening, display information from an additional timepiece module, such as an altitude reading derived from a pressure gauge positioned below the basic watch movement, can be transported through the basic movement onto the display plane at the level of the dial. In a further configuration, an information item originating from the center of the basic watch movement, e.g., about the mode of operation of a specific function of the timepiece, can be reproduced on the top or bottom of the basic watch movement via an image guide mounted in a non-continuous opening in the movement. Further configurations are conceivable and allow a very flexible application of the device according to the invention.

By special choice of the image guide, the image can be reproduced on the display plane of the device with a shifted display axis, under magnification, and/or a deformation of the display information. Also, the color design of the display information can be varied, by coloration of the image guide, for example.

In addition, the means in question for fastening the image guide or guides respectively can either be integrated directly into the module base-plate or configured as a separate component, such as in the form of a shaped socket. The socket can be mounted on the module base-plate by means of crimping, screw fittings, or by using retaining elements.

Providing image guides in associated openings, together with suitable fastening means in a device according to the invention allows both the technically simple and modular integration of additional functions into a timepiece and also the attractive reproduction of display information originally displayed on a display plane. The appropriate selection of the image guides also allows for further effects which are desirable in some circumstances. The device according to the invention can in principle be used in connection with any suitable basic watch movement which is to be integrated into a timepiece, in particular with wristwatches. The device according to the invention can therefore be used in a highly flexible and advantageous manner overall, while retaining a modular design principle.

BRIEF DESCRIPTION OF THE DRAWINGS

The attached figures illustrate a number of exemplary embodiments of a device according to the present invention.

FIGS. 2a, 2b, 2c, and 2d use exploded views to illustrate schematically the principle of four embodiments of a timepiece module according to the invention, which are based on fastening means directly integrated in the module base-plate or mounted thereon.

FIGS. 3f, 3g, and 3h show, by way of example and in schematic form, the embodiment of a timepiece module according to the invention according to FIG. 2a, in this case by means of a perspective partial view and a plan view of this embodiment in the assembled condition, and by means of a sectional view along the same line II-II, in FIG. 3g.

FIGS. 4a, 4b and 4c show, by way of example and in schematic form, the embodiment of a timepiece module according to the invention according to FIG. 2b, in this case by means of a perspective partial view and a plan view in the assembled condition, and by means of a cross-sectional view along the line III-III in FIG. 4b.

FIGS. 5a, 5b and 5c show, by way of example and in schematic form, the embodiment of a timepiece module according to the invention according to FIG. 2c, in this case by means of a perspective partial view and a plan view in the assembled condition, and by means of a cross-sectional view along the line IV-IV in FIG. 5b.

FIGS. 6a, 6b and 6c show, by way of example and in schematic form, the embodiment of a timepiece module according to the invention according to FIG. 2d, in this case by means of a perspective partial view and a plan view in the assembled condition, and by means of a cross-sectional view along the line V-V in FIG. 6b.

FIGS. 7a, 7b, 7c, and 7d illustrate in schematic form by means of a perspective exploded view, an enlarged partial view, a perspective view of the assembled condition in a partially transparent view, and by means of a cross-sectional view along line VI-VI marked in FIG. 7c, the principle of an embodiment of a timepiece module according to the invention which causes an image enlargement effect using a conical image guide.

FIGS. 8a, 8b, 8c, and 8d illustrate in schematic form by means of a perspective exploded view, an enlarged partial view, a perspective view of the assembled condition in a partially transparent view, and by means of a cross-sectional view along line VII-VII marked in FIG. 8c, the principle of an embodiment of a timepiece module according to the invention, which causes an image displacement effect using an angled image guide.

FIGS. 9a, 9b and 9c illustrate in schematic form, by means of a perspective exploded view of a basic watch movement according to the invention, a perspective partial view of the same in a partial transparent view, and a sectional view of the basic watch movement along the line VIII-VIII marked in FIG. 9a, the principle of an embodiment of a basic watch movement according to the invention which allows a transmission of the display information with the aid of an image guide onto the side of the basic watch movement facing away from the dial.

FIGS. 11a, 11b, 11c, 11d, 11e, 11f, 11g, 11h, 11i, 11J and 11k illustrate, schematically and in a perspective view, a selection of possible forms of outer sheaths of an image guide that can be used for a device according to the invention.

DETAILED DESCRIPTION

Figure 1B:
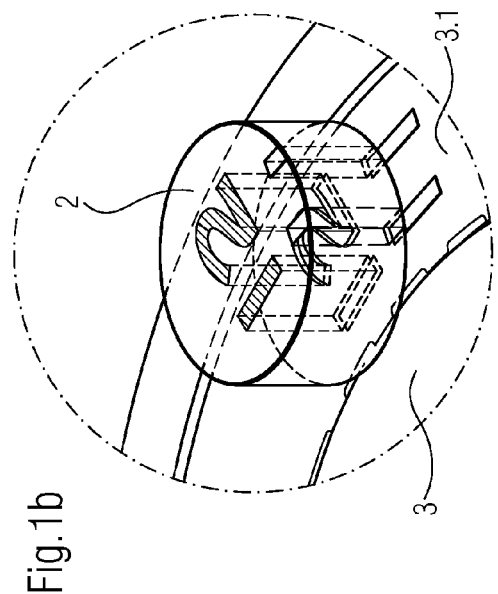
FIGS. 1a, 1b, 1c, and 1d show, using schematic, perspective views, the basic principle of a timepiece module according to the invention having an integrated image guide, these being an exploded view, an enlarged view of the image guide, and views of two different embodiments in the assembled condition of the module.

In the following, the invention will now be described in detail, with reference to the above-mentioned illustrations, in various embodiments. The aim here is to first describe the principle features of a device according to the invention based on the description of a device in the form of an additional timepiece module, before then going on to discuss the corresponding devices in the form of another type of timepiece module or of a basic watch movement.

The above-mentioned timepiece module according to the invention is primarily described based on the example of a basic watch movement with a date display, although such a device can be readily used with any desired display information reproduced by the basic watch movement. The following description therefore represents no restriction on the scope of the invention.

The term timepiece module is used in the following description such that it refers to a module which is integrated in the watch case or into the watch in addition to the basic watch movement and next to it, wherein the module is in functional cooperation with the movement of the watch, in the form that together with this latter it allows to implement at least one additional feature. This is normally the case due to the fact that the timepiece module draws driving energy from the basic watch movement to provide its additional function. In contrast, the term watch module is used in the following description to the effect that a corresponding module allows an additional function to be implemented independently of the basic watch movement of the timepiece. This is the case due to the fact that the module normally does not draw any driving energy from the basic watch movement to provide its additional function. To provide further clarification of terms, the designation module, or modular, is to be interpreted in the following in general as a standalone component with its own function, wherein this usually also involves a spatial separation in terms of the constructional volume. Particularly in the case of smaller modules, however, the latter is not necessarily the case, to the extent that smaller modules in spite of their functional autonomy can be installed, for example, within the volume of the basic watch movement.

For purposes of simplification, the term image guide is in the following generally used synonymously with the terms fiber optic, fiber-optic cable, coherent optical fiber, or even optical fiber, although strictly speaking an image guide is an ordered bundle of a large number of single fiber-optic cables or optical fibers. In general, in addition to various other applications such as optical signal transport, an image guide, like a fiber-optic cable, enables the transmission of an image from the distal end of the image guide onto its proximal end. As already mentioned above, image guides or fiber-optic cables have been generally known already for some time. At this point it is therefore not necessary to describe their structure and technical properties in detail, also to the extent that the material or the corresponding image guide components used for the present invention are commercially freely available. However, their use in the watch-making industry has not been widespread to date. The following description therefore concentrates on the aspects essential to the present invention, in particular on the integration of image guides in devices such as timepiece modules, other watch modules, or basic watch movements and on the necessary means for fastening the image guides, which make it possible in the first place to produce devices such as those proposed here, and to avoid damage to the image guides during the production and use of the corresponding timepieces.

Figure 1C:
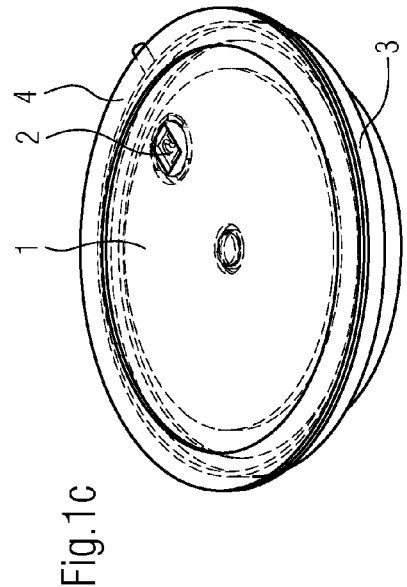
Figure 1A:
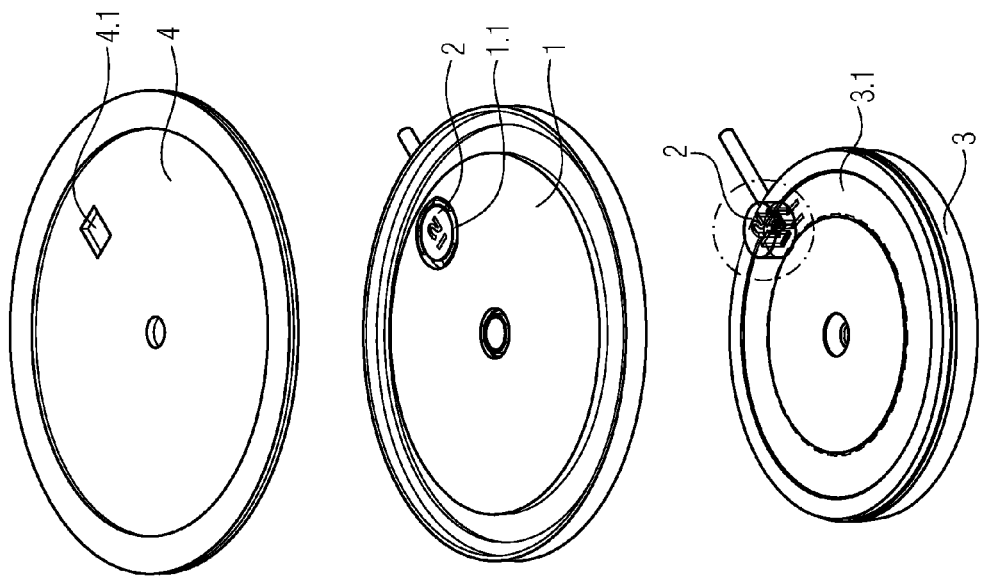

To this end, FIG. 1a shows schematically and by way of example, a perspective exploded view of a timepiece module 1 according to the invention mounted between a basic watch movement 3 and a dial 4, in order to explain the basic principle of such a device. As can be seen from this figure, one of the essential aspects of the invention consists, in contrast to the previously known prior art, in directly integrating an image guide 2 into a device, in this case, a timepiece module 1, wherein in the case explained as an example the timepiece module 1 is placed onto a basic watch movement 3, in order to equip this latter with at least one additional function. The nature of this additional function is essentially irrelevant to the present invention, and may, for example, consist in various astronomical data, an eternal calendar function, an acoustic repetition function, an alarm function, display information required in regatta or diving watches, or the like, which are provided in a compact manner by the timepiece module driven by the basic watch movement and placed thereon. The structure of the timepiece module 1 itself and the cooperation between the timepiece module 1 and the basic watch movement 3, both in relation to the provision of the additional function, is sufficiently well known to the person skilled in the art and needs no further explanation here. It is important in this context that the timepiece module 1 comprises at least one opening 1.1, in each of which an associated image guide 2 is mounted. The opening 1.1 is applied at an appropriate location in the module 1, such that in the assembled condition it is positioned above the corresponding display device of the basic watch movement 3 and below a corresponding window 4.1 in the dial 4, wherein the opening in the example described here is continuous. Depending on the application, and as will become clear in the course of the description, the opening can also be non-continuous, however, that is, starting from a particular point and facing in only one direction.

Figure 1D:
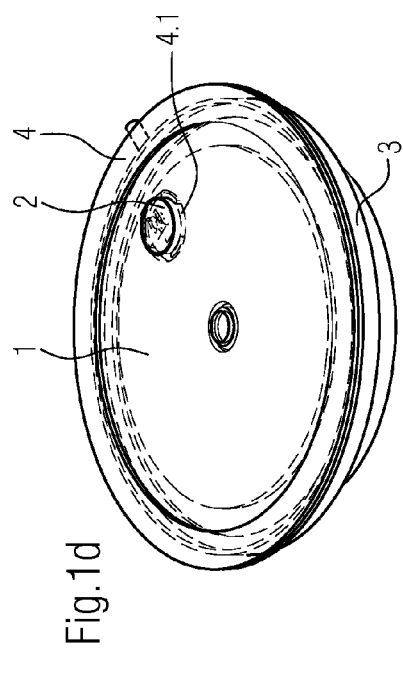
Figure 1F:
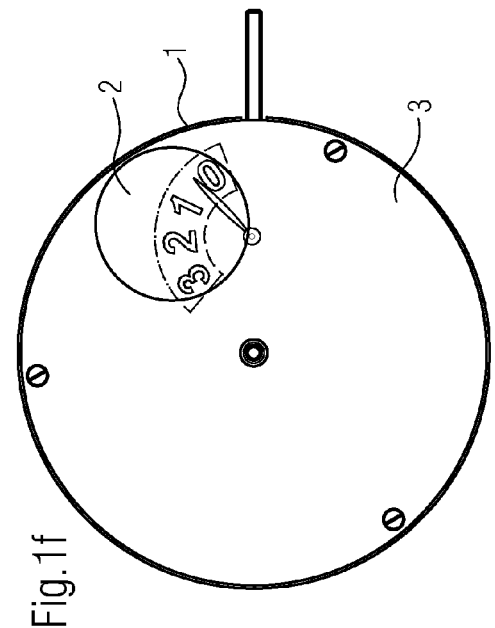
FIGS. 1e and 1f show schematic plan views of a dial on which display information originating from the basic watch movement and indicated under the cooperation of a pointer with a scale is displayed via an image guide, and, in a partially transparent view, a timepiece module according to the invention in the condition in which it is assembled with this basic watch movement.
Figure 1E:
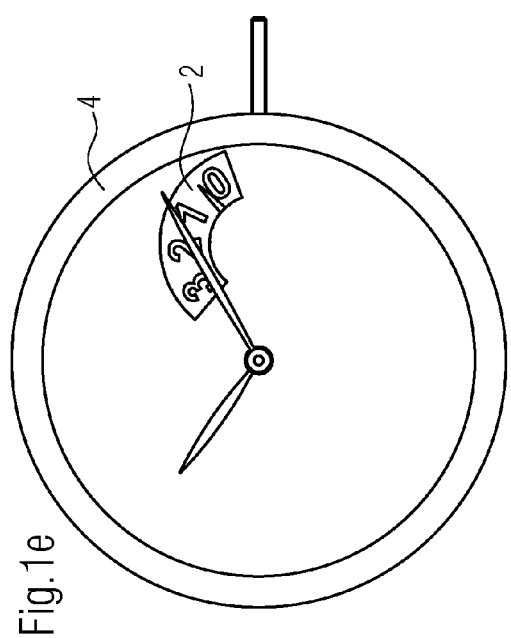

As shown in FIG. 1b in an enlarged view of the image guide 2 and also omitting the timepiece module 1, in this way, for example, the date information displayed on the representation plane of the basic watch movement 3 by means of a conventional date ring 3.1 mounted in the basic watch movement 3 can be brought up to the display plane of the timepiece module 1 with the aid of the image guide 2, that is, up to the level of the dial 4. The latter is even more evident from FIGS. 1c and 1d, which illustrate views of two different embodiments in the assembled condition. In the embodiment according to FIG. 1c the top of the image guide 2 terminates flush with the display plane of the timepiece module 1, while in the embodiment according to FIG. 1d the image guide 2 is extended upwards somewhat, so that it passes through the window 4.1 in the dial 4, to terminate flush with the surface of the dial 4. In both variations the present invention allows the observer of the watch equipped with a corresponding timepiece module 1 to be given the impression that the display of a display device actually mounted on the level of the basic watch movement 3 is delivered on the level of the timepiece module 1 or of the dial 4 respectively. Here also, the nature of the display device mounted at the level of the basic watch movement is only of secondary importance and can be chosen, for example, from among display information about the date, day of the week, month, year, phases of the moon, the timepiece's power reserve, mode indicators, alarm, world time indicators or the like. These display information items can be reproduced on the representation plane of the basic watch movement 3, both using display disks and using the cooperation of pointers and associated scales, or from a combination of these facilities, without this affecting the core of the present invention. While the former is the case in FIGS. 1a to 1d, the latter is indicated schematically and by way of example in FIGS. 1e and 1f, which show plan views respectively of a dial on which display information originating from the basic watch movement 3 and indicated by a pointer in connection with a scale is displayed via an image guide 2, and of an associated timepiece module 1, illustrated in a partially transparent view, which is placed on top of the basic watch movement 3. The development of appropriate basic watch movements 3 is sufficiently well known per se to the person skilled in the art, and needs no further explanation here.

In particular, for each of the image guides 2 integrated in the timepiece module, the timepiece module 1 has fasteners or means for fastening 5, 6 the image guide in the associated opening 1.1 in the module 1. In addition to the image guide 2 itself it is these fastening means 5, which according to the invention allow the display information originally displayed on the representation plane of the basic watch movement 3 to be able to be reproduced on the display plane of the timepiece module 1, wherein in particular this takes place in a manner suitable for wristwatches. FIGS. 2a, 2b, 2c, and 2d show schematically by means of exploded views the principle of four embodiments of a device according to the invention, or a corresponding timepiece module 1 respectively. These embodiments differ mainly in the nature of the fastening of the image guide 2 in the device, respectively the module 1, particularly with regard to whether the image guide, respectively guides 2, are integrated directly into the device, respectively the module 1, or are first mounted on fasteners which are in turn fixed to the device, respectively the module 1.

Figure 3A:
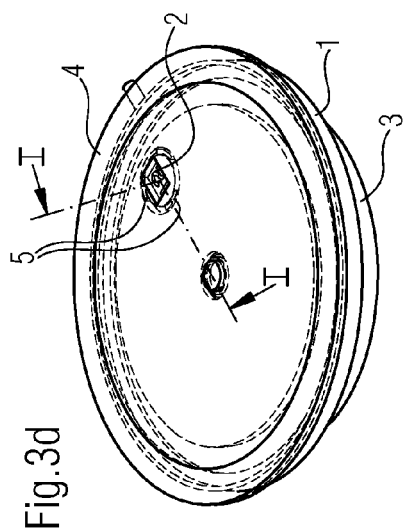
FIGS. 3a, 3b, 3c, 3d, and 3e show, by way of example and in schematic form, an embodiment of a timepiece module according to the invention according to FIG. 2a. This is shown by means of perspective views in both the unassembled and the assembled condition, and by means of a sectional view along the line I-I marked in FIG. 3d.
Figure 3B:
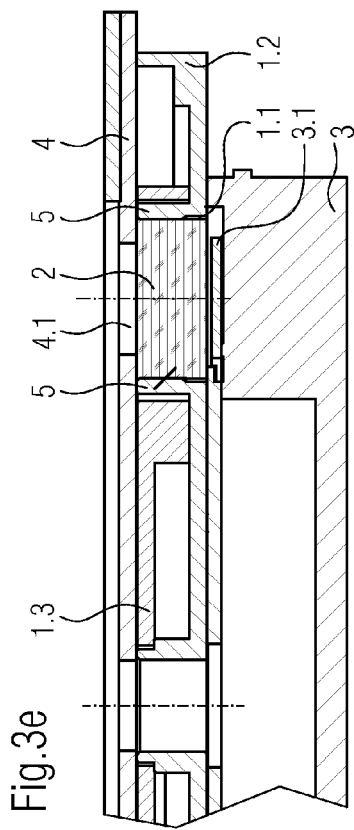
Figure 3C:
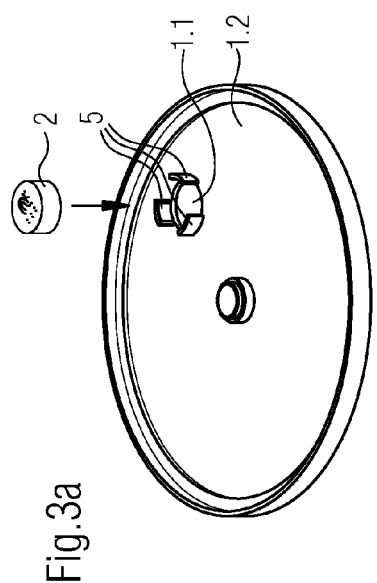
Figure 3D:
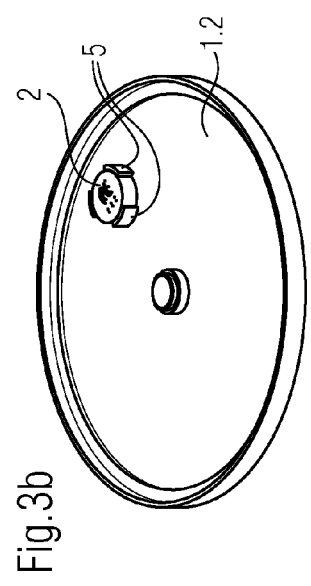
Figure 3E:
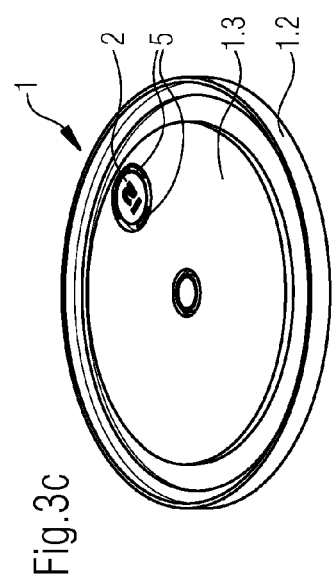

If the image guide, respectively guides 2, is or are directly integrated into the module 1, then the means for fastening 5 the image guides in the timepiece module 1 can be realized, for example, by fastening clamps 5 mounted on the module base plate 1.2. This embodiment of a timepiece module 1 according to the invention according to FIGS. 1a and 2a is shown by way of example and schematically in FIGS. 3a, 3b, 3c, 3d, and 3e. The exploded view of FIG. 3a shows the module base plate 1.2 with its easily identifiable, slightly elastic fastening clamps 5 which are distributed radially around the continuous opening 1.1 and have approximately the same height as the image guide 2 to be attached thereon. The perspective views of FIGS. 3b and 3c show the same configuration in the assembled condition, this both with and without the module bridge 1.3, which completes the module 1. The other components of the timepiece module 1, which depend on their functions and are not important for the present invention, have been omitted in the illustrations. The FIGS. 3d and 3e show this embodiment in the assembled condition with the basic watch movement 3 and with the dial 4 in a perspective view, as well as along a section along the line I-I in FIG. 3d. It still remains to be mentioned here that the said fastening clamps 5, having a noticeably bow-like cross-section, are preferably manufactured with the module base plate 1.2 from one piece. However, it is also conceivable to manufacture it separately and, where appropriate, from a different material, such as plastic, and then to fasten it on the circumference of the continuous opening 1.1 on the module base plate 1.2. The elasticity of the fastening clamps 5 can be adjusted by means of their wall thickness, for example, by multiple different wall thicknesses which are distributed at the overall height of the clamps 5. In the case of clamps 5 manufactured in one piece with the module base plate 1.2 this can be realized via holes of different diameter in the opening 1.1, which is evident, for example, from FIG. 3e, or also from the enlarged section of FIG. 9c. In each case the image guide 2, the outer circumference of which noticeably corresponds to the inner circumference of the shaped cylinder between the bowed fastening clamps 5, is pressed in between said fastening clamps 5 and thus fastened on the timepiece module 1 in a shockproof manner. In the one-piece design this variant requires no components other than the module base plate 1.2 and the image guide 2 and is therefore characterized in particular by a simple assembly, low-cost manufacture and comparatively small space requirements.

If the image guide, respectively guides 2, is or are first attached to fastening means, which in turn are fastened on the device, respectively on the module 1, then the means of attachment 6 of the image guide in the timepiece module 1 can preferably be realized by a socket attached to the module base plate 1.2. Corresponding embodiments of a timepiece module 1 according to the invention according to FIGS. 2b, 2c, and 2d are shown schematically and by way of example in greater detail in FIGS. 4a, 4b and 4c, 5a, 5b and 5c, and 6a, 6b and 6c.

The embodiment of a timepiece module 1 according to the invention according to FIG. 2b, illustrated in FIGS. 4a, 4b and 4c in the assembled condition by means of a perspective partial view and a plan view and by means of a cross-section along the line III-III in FIG. 4b, uses a socket 6 for this purpose, which is mounted in the continuous opening 1.1 on the module base plate 1.2 by means of crimping. Therefore, the socket 6 in this case, as can be identified in the cross-section of FIG. 4c, has a holding projection extending radially on the top edge of its outer circumference, which cooperates with a corresponding retaining groove, with the latter being formed by a larger aperture diameter in the upper area of the continuous opening 1.1 of the module 1. The socket 6 in this embodiment is overall noticeably hollow-cylindrical. To the extent that this variant in addition to the module base plate 1.2 and the image guide 2 requires only one other component in the form of the socket 6, it is therefore also characterized by a relatively simple assembly and a cost-effective manufacture. In addition, the socket 6 contributes to an additional securing of the image guide 2 mounted therein against shocks or impacts, in particular in the direction of the watch movement.

The embodiment of a timepiece module 1 according to the invention according to FIG. 2b, illustrated in the assembled condition in FIGS. 5a, 5b and 5c by means of a perspective partial view and a plan view and by means of a cross-section along the line IV-IV in FIG. 5b, also uses a socket 6, but which is mounted in the continuous opening 1.1 of the module base plate 1.2 by means of a screw fixing. For this purpose, in the region of its upper edge, for example, the socket 6 can have at least two lateral mounting projections with holes, through which bolts can be screwed into the module 1, so that the socket 6 with the image guide 2 attached therein can therefore be fastened to the timepiece module 1 in a shock-resistant manner. This variant also is characterized by a relatively simple assembly, and by an additional securing of the image guide 2 mounted therein against shocks or impacts, wherein in comparison to the previously described variant this is achieved without crimping.

A further alternative, which corresponds to the embodiment of a timepiece module 1 according to the invention according to FIG. 2d, is shown in the assembled condition in FIGS. 6a, 6b and 6c by means of a perspective partial view, a plan view and a cross-section along the line V-V in FIG. 6b. This alternative also uses a socket 6, which in contrast to the two previously described variants, however, is attached by using additional retaining elements 7 in the continuous opening 1.1 of the module base plate 1.2. The retaining elements 7 can, for example, be implemented in the form of small support plates with a specific shape corresponding to the outer circumference of the image guide 2, and with holes through which bolts can be screwed into the module 1, and are used for securing the socket 6 in the opening 1.1. As in both the above-mentioned embodiments, in this case, as can be seen in the cross-section of FIGS. 4b, 5b, and 6b, the socket 6 has a holding projection extending radially to the top edge of its outer circumference, which cooperates with a corresponding retaining groove in the upper area of the continuous opening 1.1 of the module 1.

Further embodiments, not shown, are conceivable, such as a socket with an external thread, which would allow a direct screw-fitting and height adjustment of the same in the timepiece module 1, possibly combined with a feeding device for the rapid fastening of the socket. Further, in the above-cited embodiments using a socket 6, the image guide 2 is preferably fastened in the said socket by means of an adhesive bond. Adhesives suitable for such a fastening include rubber-based lacquers, for example Shellac, synthetic polymers, for example, silicone rubber, silicone elastomers, or resins, or other common adhesives, glues, and sealants familiar to the person skilled in the art. On its inside, the socket 6 can advantageously have an adhesive joint extending radially around, which promotes the application and automatic distribution of excess adhesive on the inner wall of the socket 6. In comparison with the direct insertion of the image guide 2 by pressing between fastening clamps 5 of the module 1, an adhesive bond allows the risk of damage to the image guide during assembly to be drastically reduced. Here also, alternative techniques for fixing the image guide 2 in the socket are conceivable, such as insertion by pressing. In relation to the said socket 6 it still remains to be noted that—in addition to a cylindrical outer shape—it can also have a conical or angled outer shape, and/or a cylindrical, conical, angled, or right-angled inner shape, the reasons for this becoming clear later in the description.

As already mentioned briefly above, it is in fact possible by means of an image guide 2 not only to image the display information displayed on the representation plane of the basic watch movement faithfully in terms of detail and true to scale on the display plane of the timepiece module 1, respectively the dial 4. Image guides 2 are also capable of reproducing the image present at their distal end at their proximal end by applying magnification, a shifted display axis, and/or deformation of the image, which in the present case means displaying the image on the display plane of the timepiece module 1. The possibility of a magnification of the display information represented on the display plane of the basic watch movement 3 is illustrated schematically in FIGS. 7a, 7b, 7c, and 7d using a perspective exploded view and an enlarged partial view of the image guide 2 omitting the module 1, a perspective view with transparent representation of the module 1 in the assembled condition with the basic watch movement 3 and the dial 4, and a sectional view along the line VI-VI in FIG. 7c. The conical shape of the image guide 2 causes an image magnification effect here, which—as FIG. 7b shows—can be used, e.g., for realizing a large date display. Other applications are of course also conceivable.

The possibility of a displacement of the display information represented on the display plane of the basic watch movement 3 is illustrated schematically in FIGS. 8a, 8b, 8c, and 8d using a perspective exploded view and an enlarged partial view of the image guide 2 omitting the module 1, a perspective view with transparent representation of the module 1 in the assembled condition with the basic watch movement 3 and the dial 4, and a sectional view along the line VIII-VIII in FIG. 8c. The angled form of the image guide 2 here causes a displacement effect, which can be used—as can be seen in particular from FIGS. 8b and 8d—e.g., to shift the display by a distance Δ to a different location in the module 1 that is not positioned exactly above the original display field on the basic watch movement 3. Especially in the case of complicated timepiece modules 1, this can be an advantage or even technically necessary, or it can be done out of purely design—respectively aesthetic—reasons. Here also, in addition to the usage shown in the illustrations in conjunction with a date disc 3.1 on the basic watch movement 3, other applications are of course also conceivable.

As mentioned above, a device according to the invention can be implemented not only in the form of an above-described timepiece module 1, which cooperates with the basic watch movement 3 of the timepiece and allows at least one additional function to be realized therewith. Such a device may also consist of a watch module that is not in direct cooperation with the basic watch movement 3, and which implements at least one additional function of the timepiece. In this case, not illustrated in the figures, the device in the form of the watch module also comprises at least one opening, in each of which one associated image guide 2 is mounted by means of associated fastening means 5, 6, such that the image guide 2 allows the display information originally displayed on a representation plane to be reproduced on a display plane that can be selected relatively freely.

A watch module of this kind may be provided, e.g., in the form of a pressure gauge, an altimeter, a depth gauge, a barometer, a compass or as various other components which can be installed in a modular manner in a timepiece. Often, devices such as pressure gauges, whose function is independent of the driving energy of the basic watch movement 3, are mounted between the basic watch movement 3 and the base of the timepiece case. In the case of complex timepieces, which often also have a display on the base of the case, the additional installation of such a pressure gauge according to conventional methods may in some circumstances necessitate a costly redesign of the basic watch movement 3, if a different means of accommodating this display were necessary. According to the technical teaching of the present invention, a continuous opening in the watch module, i.e., in the present example in the pressure gauge, with an image guide 2 mounted therein leads to the same result without any change at all to the basic watch movement 3. Also, by applying the above explanations in relation to a timepiece module to such a watch module, it is possible, by means of a non-continuous opening in the module for example, to transfer display information, the display plane of which originally lies within the watch module, onto a relatively freely definable, external display plane on the watch module. Further possible related configurations will become clear at a later point.

Figure 9C:
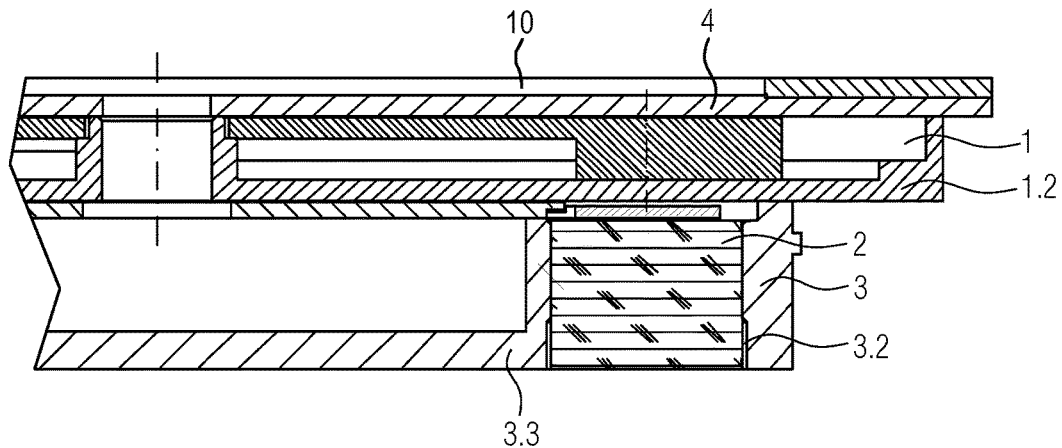

A device according to the invention may also consist of a basic watch movement 3 of a watch having a watch glass 10. This case is schematically illustrated in FIGS. 9*a*, 9*b* and 9*c* using a perspective exploded view of a basic watch movement according to the invention, a perspective partial view of the same in a partial transparent view, as well as a cross-sectional view of the basic watch movement along the line VIII-VIII marked in FIG. 9*a*. This embodiment of a device according to the invention allows, by means of an image guide 2, a transfer of the display information originally shown on the dial in the basic watch movement 3 onto the side of the basic watch movement facing away from the dial 4. Specifically, in the example illustrated, the display information is the date information, which is here displayed on the underside of the date ring 3.1 mounted on the dial side in the basic watch movement 3 by means of date numerals mounted on the underside of said date ring. The image guide 2 here is therefore fastened in a non-continuous opening 3.2, for example in a bridge or plate 3.3, of the basic watch movement 3. As in the case of a watch module, the above explanations in terms of the possible fastening means also apply here in completely analogous manner.

Figure 9D:
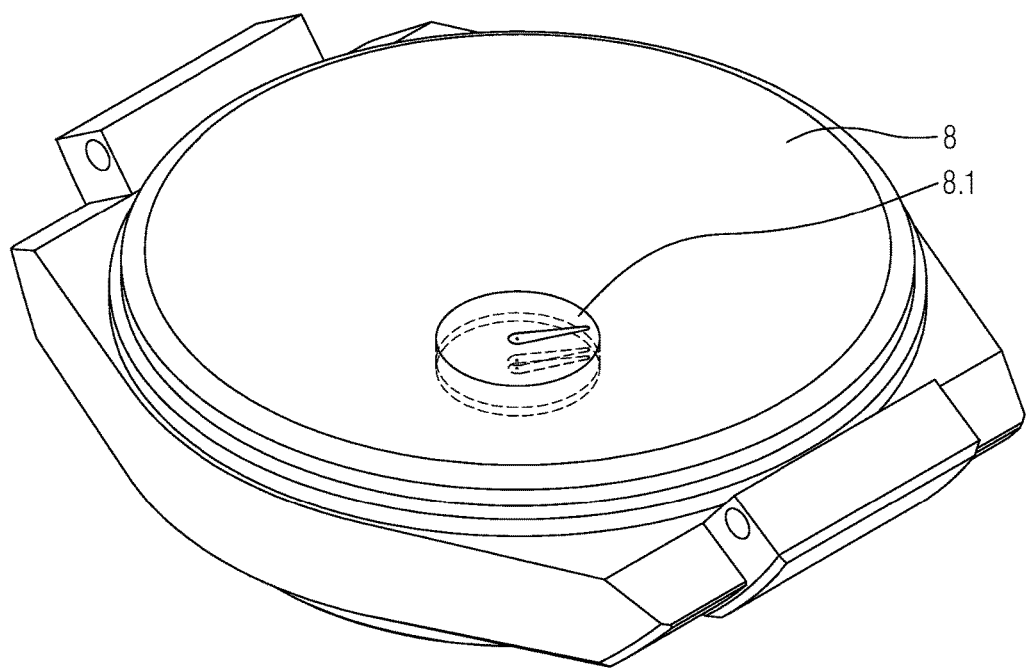
FIG. 9d shows, in schematic form and by way of example, a perspective view of a watch housing, which is equipped with a window on the base of the watch for reading display information.
Figure 10A:
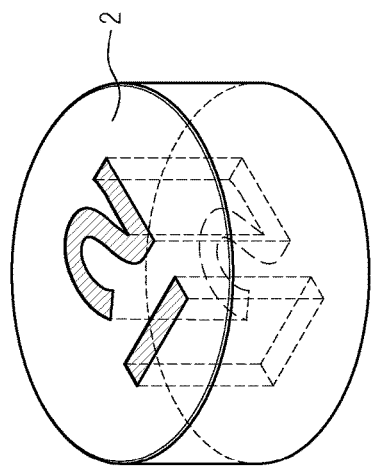
FIGS. 10a, 10b, 10c, and 10d illustrate, schematically and in a perspective view, a selection of possible forms of image guides that can be used for a device according to the invention, and their effect on the display information reproduced.
Figure 10B:
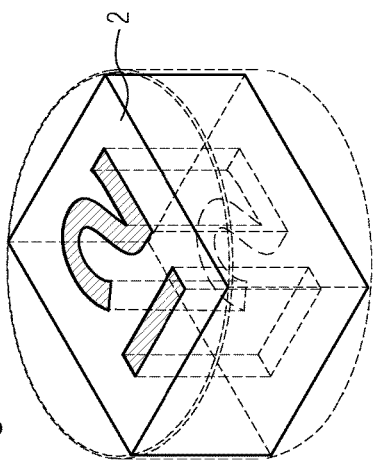
Figure 10C:
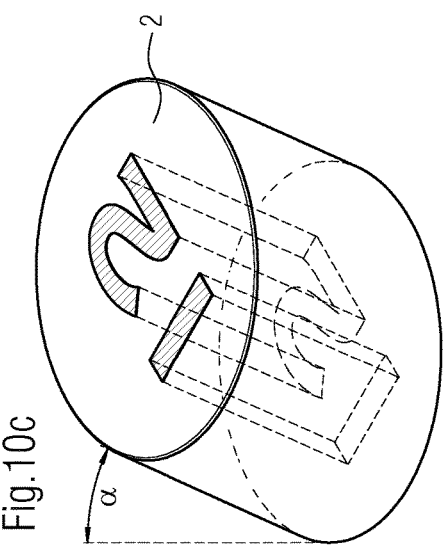
Figure 10D:
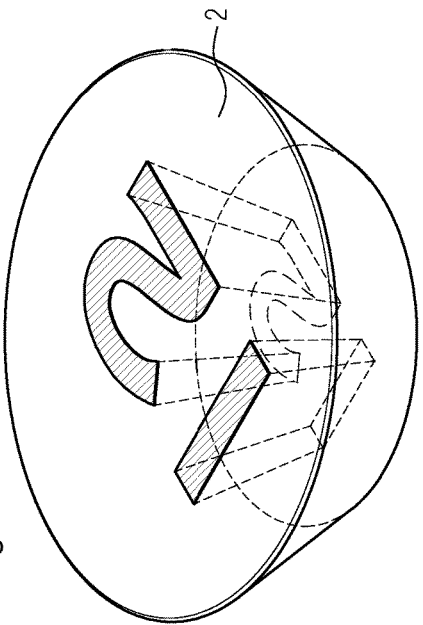

In this context, FIG. 9*d* shows, schematically and by way of example, a perspective view of a resulting display on the base of a watch case, wherein said watch base is equipped with a window for reading display information. In the illustrated case, the reproduced display is, however, not the date information, but rather a timepiece power reserve. As mentioned above, the nature of the information displayed is, however, not a core element of the present invention. In a further configuration, an information item originating from the center of the basic watch movement, e.g., about the current mode of operation of a specific function of the timepiece, can be reproduced on the top or bottom of the movement via an image guide mounted in a non-continuous opening in the movement. It should also be noted that the configurations just described relate to the general case that the movement 3 comprises at least one opening 3.2, in each of which an associated image guide 2 is mounted by means of suitable fastening means 5, 6, such that the image guide 2 allows the display information displayed on a representation plane to be reproduced on a display plane that can be relatively freely defined, wherein the original representation plane of said display information is placed in or on the basic watch movement 3 and the display plane is located at a position of the basic watch movement 3, of a timepiece module 1, or of any other watch module that is remote from the representation plane.

As already mentioned above, however, depending on the application of the present invention in a given timepiece, a range of other configurations is possible. Thus, for example, in general terms the representation plane of the said display information can be placed in or on a module not in co-operation with the basic watch movement 3, and the display plane can be located at a position of the basic watch movement 3 or a timepiece module 1 that is remote from the display plane. In practice, this could be achieved by a display information item being displayed in a watch module like the aforementioned pressure gauge, this being transferred via an image guide 2 in a non-continuous opening of the pressure gauge at the edge region thereof, and there being detected by the distal end of a further image guide 2 which is mounted in a continuous opening 3.2 in the basic watch movement 3, and transferred to the proximal end of the image guide, which is placed on the dial 4. Without further explicit examples being needed, it is thereby also clear that, in contrast, the representation plane of said display information could also be located in or on a timepiece module 1 being in cooperation with the basic watch movement 3, and the display plane located at a position of the basic watch movement 3 or of a watch module remote from the representation plane. From this technical teaching it is evident that, in principle, any combination or concatenation of the different embodiments of the device according to the invention is conceivable, in the form of a timepiece module with image guide, a watch module with image guide, and a basic watch movement with image guide, in order to reproduce display information on the desired display plane. Depending on the configuration therefore, the corresponding opening 1.1, 3.2 in the timepiece module 1, in the watch module, respectively in the basic watch movement 3, can be continuous or not continuous, but in each case is such that the image guide 2 allows the display information displayed on the representation plane of the basic watch movement 3, or of a module of the watch, to be reproduced on the desired display plane. This shows clearly that the device according to the invention is very flexible with respect to its application.

FIGS. 10*a*, 10*b*, 10*c*, and 10*d*, finally, by means of schematic perspective views, but not in a manner which in any way is claimed to be complete, provide an overview of a selection of possible forms of the image guides 2 that can be used for a device according to the invention. The illustrations also reveal the effect already mentioned above, conditioned by the shape and construction of the image guide 2, on the display information reproduced, this being indicated in each case by means of the date numeral "12" symbolically sketched on the distal—and on the proximal—end of the image guide 2. In addition to a cylindrical, conical, or angled image guide already discussed, according to these figures an image guide 2 with a rectangular external shape, for example, can also be used, for example to take into account the shape of the window 4.1 in the dial 4, or other technical circumstances. Also, although not illustrated, the possibility of using colored image guides is conceivable, for example, in order to match the display information reproduced on the display plane to the design of the dial. In addition, any desired combination of these possibilities with each other can be implemented, that is, a concatenation of corresponding image guides 2 in a module 1 according to the invention.

To be used in a device according to the invention, an image guide 2 can also have a sheath 9, which for example, in accordance with the geometric shape of the image guide 2, facilitates its fastening in the socket 6. This is also illustrated, by means of schematic perspective views in FIGS. 11a, 11b, 11c, 11d, 11e, 11f, 11g, 11h, 11i, 11j, and 11k as an overview and not in a manner which is in any way claimed to be complete. Thus for example, FIG. 11a shows a cylindrical image guide 2 having a cylindrical sheath 9, while in FIG. 11b the same image guide 2 is surrounded by a sheath 9 with a rectangular shape. The rectangular image guides 2 of FIGS. 11c, 11d, and 11e are surrounded by a sheath 9 with a cylindrical outer shape, a generally cylindrical outer shape with flattened sides, and a rectangular shape respectively, which, again, is intended to facilitate the fitting of the image guide into the opening in the device or in the socket 6. The conical or angled image guides 2 of FIGS. 11f, 11g, and 11h are provided with a sheath 9 for the same reason, which in the illustrations is shown in cylindrical form by way of example. In the case of FIG. 11g, the image guide 2 is placed at the proximal end concentrically to the sheath 9, while in FIG. 11h this is its distal end, so that even here a creative freedom is apparent in the choice of the representation position of the display information to be transmitted. Finally, FIGS. 11i, 11j and 11k illustrate roughly cylindrical sheaths 9 for image guides 2, with the sheath 9 being equipped with various shapes at the radially outer side, which serve to simplify the assembly. Thus, for example, the sheath 9 according to FIG. 11i has notches extending parallel to the axis of the image guide 2 on the radially outer side, while the sheaths 9 according to FIGS. 11j and 11k have annular continuations at one, respectively both ends of their radially outer sides. The diversity of the possible forms of the sheaths 9 depending on the use of the image guide 2 and the assembly thereof in the device according to the invention does not permit a complete listing, so that the illustrations represent only a selection of the possible forms without restriction of the subject matter of the invention. The sheath 9 of an image guide 2 can be produced for a device according to the invention, for example, by means of the so-called insert-molding process, by overmolding or recasting. The material for the sheath 9 preferably consists of a synthetic material, such as plastic or thermosetting plastics, or of resin-like substances. As is evident from the illustrations, the above-cited method allows the overmolding or recasting of image guides 2 of various shapes, including complex geometrical shapes, with sheaths 9 of a simple outer form, preferably with a cylindrical, rectangular, or polyhedral outer form. Image guides 2 encapsulated in this way can subsequently be installed in the device with no, or at least with far less, technically elaborate and time-consuming production and control processes, such as sawing, grinding or polishing.

Finally, it should also be mentioned that the present invention can self-evidently also be applied to a timepiece which comprises a device as described above, in particular such a timepiece module 1, such a watch module or such a basic watch movement.

The device according to the invention therefore allows, contrary to the prevailing view of the person skilled in the art of watch-making, an integration of image guides into watches, and in particular the realization of a device which, under a preferably modular type of construction, allows additional functions to be added to a basic watch movement, at the same time allowing, without aesthetic disadvantage, the display information displayed on the original representation plane, for example, the plane of the basic watch movement, to be observed in a display plane that can be selected relatively freely. In addition, the above detailed description of the device according to the invention illustrates that the present invention allows, in an optimal manner, the fastening of the image guide to be implemented by design features that are kept conceptually simple. The fastening means provided firstly facilitate the effective capability of using image guides in watches, to the extent that by means of a fastening according to the present invention, the image guides, which are sensitive as a result of their material properties, can be installed in watches without damage, respectively their processing and assembly can be integrated into existing production processes in the simplest possible manner. Secondly, these fastening means effectively protect the image guide integrated in the device against shocks or impacts in the course of the use of the associated wristwatch. The general design, in the form of the integration of the image guide into a device such as a timepiece module, also allows a relatively simple and low-cost production and subsequent maintenance of the system. To the extent that the proposed device requires no significant changes to the timepiece, the system according to the invention also has the advantage that it can be used with the vast majority of timepieces on the market. In particular, however, the device according to the invention satisfies in an exemplary manner the aesthetic requirements which are placed on contemporary watches, especially in the sector of high-quality, mechanical wristwatches.

The invention claimed is:

1. A device for reproducing display information suitable for integration into a wristwatch which comprises a watch case, a watch glass mounted on the watch case, a dial situated underneath the watch glass, and a watch movement placed underneath the dial and inside the watch case, comprising:
   a watch module defining an opening, the watch module positioned underneath the dial, and allowing for implementation of at least one additional function of the wristwatch;
   an image guide mounted in the opening of the watch module; and
   fasteners for fastening the image guide in the opening;
   wherein, the image guide allows display information displayed on a representation plane to be reproduced on a display plane.

2. The device according to claim 1, wherein the watch module functions in cooperation with a basic watch movement of the watch to provide the at least one additional function of the wristwatch.

3. The device according to claim 2, wherein the opening in the watch module is continuous, such that the image guide allows display information displayed on the representation plane of the watch movement or of a module of the timepiece to be displayed on the display plane of the watch module.

4. The device according to claim 1, wherein the watch module is not in direct cooperation with a basic watch movement, such that the watch module functions independently to provide the at least one additional function of the watch.

5. The device according to claim 4, wherein the watch module is selected from the group consisting of a pressure gauge, altimeter, depth gauge, barometer, and compass.

6. The device according to claim 1, wherein the fasteners for fastening the image guide comprise fastening clamps mounted on a base plate of the watch module.

7. The device according to claim 6, wherein said fastening clamps are produced integrally with the base plate of the watch module.

8. The device according to claim 1, wherein the fasteners for fastening the image guide are implemented by a socket mounted on a base plate of the watch module.

9. The device according to claim 8, wherein said socket is mounted on the base plate by crimping, screw fitting, or by the use of retaining elements.

10. The device according claim 8, wherein said socket has a cylindrical, rectangular, or polygonal outer shape, and/or a cylindrical, conical, angled, rectangular or polygonal inner shape.

11. The device according to claim 8, wherein the image guide is mounted in said socket by adhesive bonding.

12. The device according to claim 11, wherein said socket has an adhesive joint extending on the inside thereof.

13. The device according to claim 1, wherein the image guide allows reproduction of display information which is displayed on the representation plane of the watch module using display disks or pointers on the display plane.

14. The device according to claim 1, wherein the display information reproduced on the display plane is chosen from a group of display information consisting of a date, day of the week, month, year, phases of the moon, timepiece power reserve, mode indicator, alarm indicator, world time indicator, altitude, depth, and pressure.

15. The device according to claim 1, wherein the image guide allows the display information reproduced on the display plane to be reproduced under displacement of the display axis, magnification, coloration, or under deformation of the display information.

16. The device according to claim 1, wherein the image guide has a sheath.

17. A wristwatch, wherein the wristwatch comprises the device of claim 1.

18. A device for reproducing display information suitable for integration into a wristwatch that includes a dial and a watch case, comprising:
a basic watch movement defining an opening, the watch movement positioned underneath the dial and in the watch case, the watch movement allowing for implementation of at least one additional function of the wristwatch;
an image guide mounted in the opening of the basic watch module; and
fasteners for fastening the image guide in the opening;
wherein, the image guide allows display information displayed on a representation plane to be reproduced on a display plane.

19. The device according to claim 18, wherein the fasteners for fastening the image guide comprise fastening clamps mounted on a bridge of the basic watch movement.

20. The device according to claim 19, wherein said fastening clamps are produced integrally with the bridge of the basic watch movement.

21. The device according to claim 19, wherein the representation plane of said display information is placed in or on the basic watch movement and the display plane is located at a position of the basic watch movement, or of a watch module that is remote from the representation plane.

22. The device according to claim 19, wherein the representation plane of said display information is located in or on a watch module that is not in cooperation with the basic watch movement and the display plane is located at a position of the basic watch movement or of a watch module that is remote from the representation plane.

23. The device according to claim 18, wherein the fasteners for fastening the image guide are implemented by a socket mounted on a bridge of the basic watch movement.

24. The device according to claim 23, wherein said socket is mounted on the bridge by crimping, screw fitting, or by the use of retaining elements.

25. The device according claim 23, wherein said socket has a cylindrical, rectangular, or polygonal outer shape, and/or a cylindrical, conical, angled, rectangular or polygonal inner shape.

26. The device according to claim 23, wherein the image guide is mounted in said socket by adhesive bonding.

27. The device according to claim 26, wherein said socket has an adhesive joint extending on the inside thereof.

28. The device according to claim 18, wherein the image guide allows reproduction of display information which is displayed on the representation plane of the basic watch movement, or of a watch module, using display disks or pointers on the display plane.

29. The device according to claim 18, wherein the display information reproduced on the display plane is chosen from a group of display information consisting of a date, day of the week, month, year, phases of the moon, timepiece power reserve, mode indicator, alarm indicator, world time indicator, altitude, depth, and pressure.

30. The device according to claim 18, wherein the image guide allows the display information reproduced on the display plane to be reproduced under displacement of the display axis, magnification, coloration, or under deformation of the display information.

31. The device according to claim 18, wherein the image guide has a sheath.

32. A wristwatch, wherein the wristwatch comprises the device of claim 18.

* * * * *